United States Patent
Klintberg et al.

(10) Patent No.: US 12,122,396 B2
(45) Date of Patent: Oct. 22, 2024

(54) METHOD FOR QUANTIFYING CORRECTNESS OF A VEHICLE MODEL

(71) Applicant: VOLVO TRUCK CORPORATION, Gothenburg (SE)

(72) Inventors: Emil Klintberg, Torslanda (SE); Linus Hagvall, Gothenburg (SE); Fredrik Sandblom, Mölndal (SE); Oskar Wigström, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 301 days.

(21) Appl. No.: 17/596,293

(22) PCT Filed: Jun. 14, 2019

(86) PCT No.: PCT/EP2019/065729
§ 371 (c)(1),
(2) Date: Dec. 7, 2021

(87) PCT Pub. No.: WO2020/249235
PCT Pub. Date: Dec. 17, 2020

(65) Prior Publication Data
US 2022/0250631 A1 Aug. 11, 2022

(51) Int. Cl.
*B60W 50/00* (2006.01)
*B60W 30/09* (2012.01)
(Continued)

(52) U.S. Cl.
CPC ........ *B60W 50/0097* (2013.01); *B60W 30/09* (2013.01); *B60W 60/0015* (2020.02); *G05B 23/0254* (2013.01)

(58) Field of Classification Search
CPC ............ B60W 50/0097; B60W 30/09; B60W 60/0015; G05B 23/0254; G05B 2219/2637; G05B 13/048; B62D 15/0265; G05D 1/00
See application file for complete search history.

(56) References Cited

U.S. PATENT DOCUMENTS

| | | | |
|---|---|---|---|
| 2005/0090938 A1* | 4/2005 | Ranelli | G05D 1/0278 701/1 |
| 2011/0025558 A1* | 2/2011 | Levy | G01S 19/08 342/357.58 |

(Continued)

FOREIGN PATENT DOCUMENTS

| | | | |
|---|---|---|---|
| JP | 2009146377 A | * | 7/2009 |
| KR | 2014119596 A | * | 10/2014 |
| WO | 2016168650 A1 | | 10/2016 |

OTHER PUBLICATIONS

Lili et al. "Determining the Required Probe Vehicle Size for Real-Time Travel Time Estimation on Signalized Arterial" IEEE, Nov. 2018, pp. 4546-4554. (Year: 2018).*

(Continued)

*Primary Examiner* — Navid Z. Mehdizadeh
*Assistant Examiner* — Caitlin R McCleary
(74) *Attorney, Agent, or Firm* — Venable LLP; Jeffri A. Kaminski

(57) ABSTRACT

A method for quantifying correctness of a vehicle model f(•). The method comprises obtaining prediction errors (A) by evaluating the model f(•) over a range of input parameters, determining a threshold $\zeta$ such that the prediction errors in excess of the threshold $\zeta$, $\{\varepsilon_i: \varepsilon_i \leq \zeta\}$, follow a Generalized Pareto Distribution, GDP, and parameterizing a GDP based on the prediction errors in excess of the threshold $\zeta$ $\{\varepsilon_i: \varepsilon_i \leq\}$.

(Continued)

The method then quantifies correctness of the vehicle model f(•) based on the parameterized GDP.

12 Claims, 4 Drawing Sheets

(51) Int. Cl.
    *B60W 60/00*    (2020.01)
    *G05B 23/02*    (2006.01)

(56) References Cited

U.S. PATENT DOCUMENTS

2014/0149325 A1    5/2014    Clifton et al.
2017/0139423 A1*  5/2017    El Ferik ............... G05D 1/0295
2019/0315366 A1* 10/2019   Yoo ........................ B60K 28/06

OTHER PUBLICATIONS

English machine translation of JP 2009146377 A. (Year: 2009).*
English machine translation of KR 20140119596 A. (Year: 2014).*
International Search Report and Written Opinion dated Mar. 25, 2020 in corresponding International PCT Application No. PCT/EP2019/065729, 9 pages.
Salehpour M et al.: Improving ride and handling of vehicle vibration model using Pareto robust genetic algorithms, Innovations in Intelligent Systems and Applications (INISTA). 2011 International Symposium On, IEEE, Jun. 15, 2011 (Jun. 15, 2011), pp. 272-276, XP032002799.
H. Rootzen and N. Tajvidi, "Multivariate generalized Pareto distributions", Bernoulli, vol. 12, No. 5, 2006.

* cited by examiner

METHOD FOR QUANTIFYING CORRECTNESS OF A VEHICLE MODEL

CROSS-REFERENCE TO RELATED APPLICATIONS

This application is a U.S. National Stage application of PCT/EP2019/065729, filed Jun. 14, 2019, and published on Dec. 17, 2020, as WO 2020/249235 A1, all of which is hereby incorporated by reference in its entirety.

TECHNICAL FIELD

The present disclosure relates to methods, control units and vehicles for quantifying correctness of a vehicle model, or for quantifying correctness of a model associated with a vehicle. The model may be, e.g., a model of vehicle dynamic properties or a model of an expected response by the vehicle to various control inputs. The methods disclosed herein can be applied to bound prediction errors associated with the model and finds applications in autonomous drive and other safety critical functions.

The invention can be applied in heavy-duty vehicles, such as trucks and construction equipment. Although the invention will be described mainly with respect to a semi-trailer type vehicle, the invention is not restricted to this particular vehicle, but may also be used in other types of vehicles such as in rigid trucks, construction equipment, busses and also in cars.

BACKGROUND

Autonomous and semi-autonomous vehicles use various types of processing systems and sensor input signals for navigation and vehicle control. Advanced driver assistance systems (ADAS) are also based on sensor input signals. If parts of the vehicle system fail it may be required to transition the vehicle into a minimum risk condition. This type of maneuver may be referred to as a situation avoidance maneuver (SAM), in which a vehicle autonomously performs a maneuver to avoid an undesired situation, such as a detected risk scenario.

US 2018/0224851 A1 relates to the problem of executing a safe stop maneuver in case a GPS signal is lost. A position estimate based on dead reckoning is used in case the primary positioning system is malfunctioning.

In order to be able to plan a SAM and determine a probability of success associated with a given SAM, it is necessary to have an idea of what prediction error magnitude a given vehicle model is associated with. In other words, it is desired to quantify correctness of the vehicle model.

There is a need for improved methods of quantifying model correctness.

SUMMARY

It is an object of the present disclosure to provide methods for quantifying correctness of a model associated with a vehicle. This object is obtained by a method for quantifying correctness of a model $f(\bullet)$ associated with a vehicle. The method comprises obtaining prediction errors $\varepsilon_{i_j=1}^{n-1}$ by evaluating the model $f(\bullet)$ over a range of input parameters, determining a threshold $\zeta$ such that the prediction errors in excess of the threshold $\zeta$, $\{\varepsilon_i : \varepsilon_i \not< \zeta\}$, follow a Generalized Pareto Distribution (GDP), parameterizing a GDP based on the prediction errors in excess of the threshold $\zeta$ $\{\varepsilon_i : \varepsilon_i \not< \zeta\}$, and quantifying correctness of the model $f(\bullet)$ based on the parameterized GDP.

An important feature of the disclosed method is that the required amount of data that is needed in order to quantify correctness of the models is reduced. By allowing model correctness analysis based on a reduced set of data, development and testing time is reduced, which is an advantage. Also, some types of analysis which were previously not possible to perform since they simply required too much data is now enabled by the disclosed methods.

According to some aspects, the obtaining comprises obtaining a previously stored sequence of vehicle states $\{x_i\}_{i=1}^n$ and control inputs $\{u_i\}_{i=1}^{n-1}$, and determining prediction errors as $\varepsilon_i = x_{i+1} - f(x_i, u_i)$, $i=1, \ldots, n-1$. According to some other aspects the obtaining comprises obtaining a sequence of vehicle states $\{x_i\}_{i=1}^n$ and control inputs $\{u_i\}_{i=1}^{n-1}$ during vehicle operation, and determining prediction errors as $\varepsilon_i = x_{i+1} - f(x_i, u_i)$, $i=1, \ldots, n-1$. Thus, the disclosed methods are applicable for both off-line and/or on-line processing, which is an advantage. On-line processing may, e.g., be used to complement more extensive off-line processing, leading to improved model verification and thus improved vehicle operation.

The method optionally comprises quantifying the prediction error $\varepsilon_k$ of the vehicle model as a bounded disturbance model by bounding it to lie within a range $-\overline{w} \leq \varepsilon_k \leq \overline{w}$ with probability greater than $1-\gamma$, based on the parameterized GDP.

By bounding the prediction error in this way, formal methods from, e.g., control theory are enabled which allow, e.g., analysis of vehicle state as it transitions into a safe state during an emergency maneuver. Bounds on prediction error also enable risk assessment of various driving scenarios, both off-line and in real time. The bounded disturbance models obtained from the disclosed methods can also be used to decide when to trigger an emergency maneuver by the vehicle.

According to aspects, the method further comprises determining a confidence value #associated with the parameterized GDP. This confidence value will be discussed in more detail below. It indicates the confidence obtained in the parameterized GDP, i.e., if the a GDP can be accurately fitted to the available data or if more data is needed for a good fit. The methods disclosed herein therefore also enable providing constructive feedback on when a data collection is done, i.e., when a sufficient amount of data has been collected for quantifying correctness of a given model associated with some vehicle up to some level of confidence. For instance, according to aspects, the method comprises assessing a sufficiency of gathered model data for model correctness verification based on the confidence value $\beta$ associated with the parameterized GDP.

According to aspects, the method comprises monitoring an operational design domain (ODD) associated with the vehicle by comparing the parameterized GDP to a set of baseline GDP parameters, wherein operation outside the ODD is indicated by a difference between parameterized GDP parameters and baseline GDP parameters.

In other words, yet another feature of the disclosed methods is that intermediate results can be used to construct a monitor of at least part of the ODD. These particular aspects are also applicable as a foundation for independent stand-alone methods not depending on the above discussed methods. Consequently, there is disclosed herein a method for monitoring an ODD associated with vehicle. The method comprises obtaining a parameterized GDP from prediction errors related to a vehicle model used during vehicle operation, like described above or in some other way. The method also comprises monitoring an ODD associated with the vehicle by comparing the parameterized GDP to a set of baseline GDP parameters, wherein operation outside the ODD is indicated by a difference between parameterized GDP parameters and baseline GDP parameters.

According to aspects, the method comprises measuring a time between exceedances metric indicating the time passed between errors exceeding the threshold $\zeta$, and monitoring ODD based on the time between exceedances metric.

This is a relatively simple metric to determine, yet it is a powerful indicator of when a vehicle is operating outside its ODD.

There is also disclosed herein control units, computer programs, computer readable media, computer program products, systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
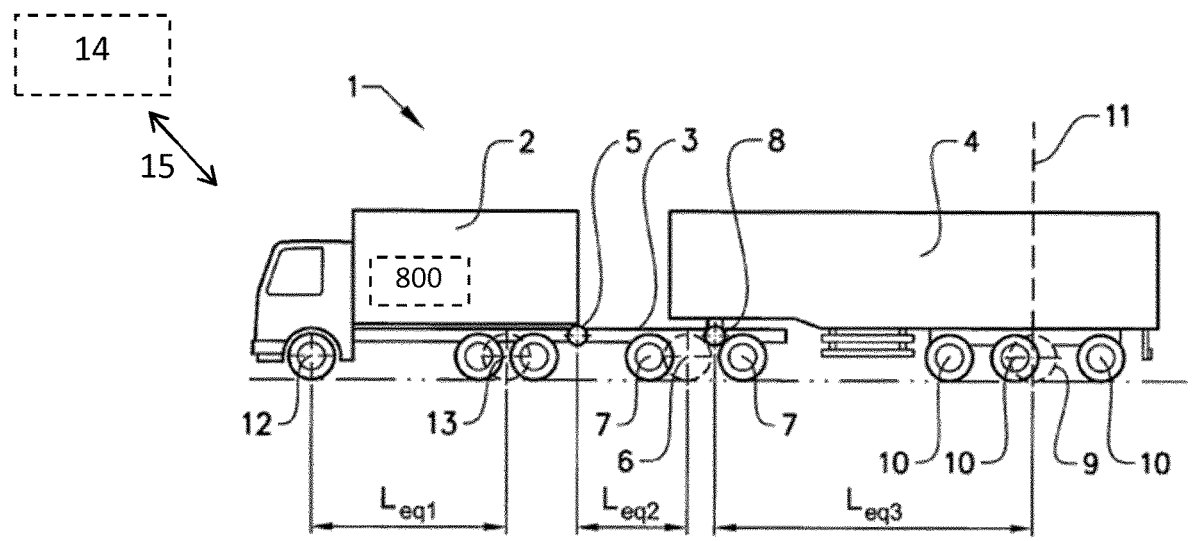
FIG. 1 schematically illustrates a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows a schematic articulated vehicle combination 1 comprising a towing vehicle 2 and two towed vehicles 3, 4. The towing vehicle may be a regular truck adapted for commercial highway use or a tractor having a fifth wheel, but may also be an off-road truck, a bus, or a recreational vehicle. The first towed vehicle or trailer 3 is in the shown example a dolly having a drawbar connected to the trailer coupling of the truck. The dolly is provided with two wheel-axles 7. The second towed vehicle or trailer 4 is a semitrailer, which is provided with a kingpin 8 that is connected to the fifth wheel of the dolly. This example shows a common type of a longer vehicle combination, but it is also possible to use other types of vehicle combinations having other types of towing vehicles and other types and numbers of towed vehicles. Different vehicle combinations may include a truck with a regular trailer, a truck with a center axle trailer, a truck with a dolly and a semitrailer, a tractor with a semitrailer, a tractor with a B-link and a semitrailer, a tractor with a semitrailer and a regular trailer or a tractor with a semitrailer dolly and a semitrailer.

In the shown vehicle combination, the effective wheelbase Leq1 of the towing vehicle, i.e. the truck, is the length from the front axle 12 to the virtual axle 13 of the truck. The effective wheelbase Leq2 of the first towed vehicle, i.e. the dolly, is the length from the drawbar connection to the virtual axle 6 of the dolly. The effective wheelbase Leq3 of the second towed trailer extends from the king pin 8 to the to the virtual rear axle 9 of the trailer 4.

The towing vehicle may be provided with various autonomous or semi-autonomous driving functions comprising processing circuitry and sensor systems. For instance, the vehicle may comprise a control unit 800 which will be discussed in more detail below in connection to FIG. 8.

The vehicle may be connected 15 to a processing device 14 arranged to perform off-line calculations to assist the vehicle control system. The connection 15 is preferably wireless but may also be a wireline connection or a connection via some storage module such as a hard drive or the like.

The vehicle geometry and axle configurations have an impact on how the vehicle responds to a given control input in a driving scenario. An autonomous drive system (ADS) if often required to maintain accident risk is at a tolerable level. This can be achieved by limiting the operation of the vehicle to driving scenarios where it can be shown with high probability that the vehicle can avoid or mitigate accidents, e.g., by executing a SAM or even an MRM. Establishing a probability of success for a given SAM is often based on models of the vehicle dynamics during the transition to a safe state.

The dynamics of the vehicle 1 also depend on the velocity of the vehicle. For instance, the lateral or centripetal acceleration $a_y$, depends on vehicle longitudinal velocity $v_x$ and on the turn radius R as $a_y = v_x^2/R$, for a constant turn radius R. Also, the trailer behaves differently at different velocities. For a slow moving articulated vehicle 1, the trailer 3, 4 will cut inwards for a constant radius turn as discussed in U.S. Pat. No. 9,862,413 B2, thereby expanding the swept area inwards, i.e., towards the center of a circle segment representing the turn. For a faster moving articulated vehicle, the lateral acceleration $a_y$ may be strong enough to cause some skidding of the trailer, which effect then instead expands the swept area outwards, i.e., away from the center of a circle segment representing the turn. For an articulated vehicle 1 which does not execute a turn or where R is very large (and where the vehicle does not suffer a jack-knifing event), the swept area will not be expanded beyond the area covered by the towing vehicle, since the trailer will follow the same track as the towing vehicle. The area which is swept by the articulated vehicle 1 therefore normally increases at low velocity, i.e., a slow moving articulated vehicle may actually sweep a larger area compared to the same articulated vehicle moving at higher velocity. The swept area is at a minimum for some 'ideal' or 'optimal' velocity, and then increases again for sufficiently high velocities where skidding occurs due to the increased centripetal acceleration.

A model associated with the vehicle 1 may, e.g., be a model of vehicle dynamics, a model of corner stiffness, a joint model of vehicle and road, etc. It is appreciated that the methods disclosed herein are applicable to a wide variety of different models, and not just to vehicle models per se, but to models of parts of the vehicle, e.g., a chassis, and joint models describing the vehicle in a context, such as a joint vehicle and road model.

Due to the number of influencing factors involved, it is not easy to quantify the prediction errors associated with a given model. This will in the following be referred to as quantifying correctness of a model such as a vehicle model.

A vehicle state is a collection of variables which together describe in what state the vehicle is currently in. Herein, vehicle state comprises variables associated with vehicle location (coordinates) and orientation (such as, e.g., heading, steering angle and articulation angle). The vehicle state also comprises information associated with vehicle dynamic state, i.e., vehicle velocity, acceleration, turn rate, and so on. The vehicle state is often represented as a vector of state variables x. As will be discussed in more detail below, the allowable vehicle state space may, in general, comprise both upper and lower limits on state variables such as lateral position for the duration of a maneuver.

A vehicle model typically describes nominal behaviors of vehicle systems, such as the tractor-trailer combination illustrated in FIG. 1, and can take the form of e.g. a difference equation $$x_{k+1} = f(x_k, u_k)$$

where $x_k \in R^{n_x}$ and $u_k \in R^{n_u}$ denote the vehicle state vector and control signal at time instant k, and where $f(\cdot)$ denotes a vehicle model. Note that, if the prediction error of the previous model at time instant k+1 is $\varepsilon_k$, the model $$x_{k+1} = f(x_k, u_k) + \varepsilon_k$$

would correspond to the actual (true) vehicle state transition from time k to time k+1.

The problem of quantifying the prediction error $\varepsilon_k$ can be regarded as complementing the nominal model with a compact set $W = \{w | -\overline{w} \leq w \leq \overline{w}\} \subset R^{n_x}$ such that $$\mathrm{Prob}(\varepsilon_k \notin W) \leq \gamma.$$

The correctness of the models in a safety critical application are normally associated with strict requirements and, consequently, the probability $\gamma$ is often small. Traditional statistical methods would normally assume some distribution for the prediction errors, of which the tails would be used to ensure the correctness of a proposed compact set W. Unfortunately, for traditional statistical methods, the amount of data required to ensure sufficient model correctness is very high.

Herein, 'safe' is given a broad interpretation. A safe vehicle state may be a state in which the vehicle and/or vehicle occupant and/or other road user is not subject to risk in terms of injury or damage.

Some examples may be given of a safe condition and of an unsafe condition; According to some aspects, a situation where a risk of collision is unlikely may be considered a safe state.

According to some other aspects, a situation where a risk of collision is not unlikely may still be considered a safe state depending on the object. I.e., colliding with a small bush or tree may be considered safe, while colliding with another vehicle or a larger object like a brick wall may be considered unsafe.

According to some further aspects, colliding with another vehicle where it has been determined beforehand, e.g., via vehicle-to-vehicle (V2V) communications, that a collision can be tolerated with low risk, may be considered safe.

According to aspects, a situation where the vehicle risks exiting a drivable area is considered unsafe.

According to other aspects, exiting a drivable area may be considered safe depending on the properties of the ground outside the drivable area, as discussed above.

A state space is an N-dimensional space which represents ranges of vehicle states. Physics always limits the state space depending on type of vehicle, e.g., by a maximum attainable velocity and acceleration. The control unit 800 may impose further constraints on the state space, thereby limiting the vehicle state space to some ranges of values.

Autonomous and semi-autonomous articulated vehicles rely on sensor signal input in order to control the vehicle, with or without a driver. Sensor systems arranged on vehicles for supporting autonomous functions may comprise any of; radio detection and ranging (radar) sensors, light detection and ranging (lidar) sensors, vision-based sensors such as cameras, and global positioning system (GPS) receivers. These sensors monitor the vehicle surroundings in order to detect obstacles and to ascertain, e.g., the geometry of the drivable area ahead of the vehicle. Vehicles may also comprise a number of on-board sensors, such as steering angle sensor, articulation angle sensor, i.e., a sensor which measures the angle between towing truck and trailer, wheel speed sensors, and inertial measurement units (IMU).

A critical situation may result in case a vehicle loses sensor input from one or more sensor systems. For instance, radar and lidar data sensors may break down, or processing units responsible for processing sensor signal data may experience outage. If critical sensor signals are lost, or some critical operation is otherwise hampered, an automatic maneuver such as a safe stop maneuver may be necessary. This maneuver can then be executed based on control using on-board sensor systems. I.e., dead reckoning using wheel speed and perhaps also steering wheel angle sensors.

Herein, a minimum risk maneuver (MRM) is a maneuver which transitions the vehicle into a safe state. A safe stop maneuver is an example of an MRM. However, MRMs may also comprise maintaining a constant velocity in a given lane or performing an obstacle avoidance maneuver. An MRM is an example of a situation avoidance maneuver (SAM). The class of situation avoidance maneuvers comprise all maneuvers which can be executed to avoid undesired situations, such as detected risk situations. A SAM may also relate to, e.g., a difficult parking situation or the like.

An example of when a bounded disturbance model or bounded model prediction errors are useful will now be given.

A SAM may not always be possible to execute in a safe manner in case, e.g., vehicle velocity is too high, or the vehicle is located at an unsuitable lateral position with respect to a road boundary. If a SAM is possible for all disturbance effects that may occur during the maneuver, then the SAM is said to be initiable with prospect for success. On the other hand, if there exist at least one disturbance event which cannot be compensated for by a respective control command, then the SAM is not guaranteed to be successful. However, this does not imply that the SAM is impossible to perform for all possible disturbances, only for some. In other words, at any given time, the existence of a single safe maneuver that can be executed is a sufficient condition for safety. However, if the maneuver cannot be initiated with prospect for success at the next decision point, it has to be initiated immediately. Immediate execution is always possible because the ability to execute a safe maneuver at this decision point was the criteria for not executing a safe maneuver at the previous decision point.

According to some aspects, initialized with prospect of success means that the maneuver can be completed successfully with high probability. According to some aspects this probability can be said to be approaching 100%, i.e., close to guaranteed success of the maneuver. According to some other aspects, the probability is below 100%, e.g., 99.999% (also known as the five-nines requirement). In other words, a threshold can be configured which determines the probability or likelihood required in order for the maneuver to be said to be initiable with prospect for success.

Figure 2:
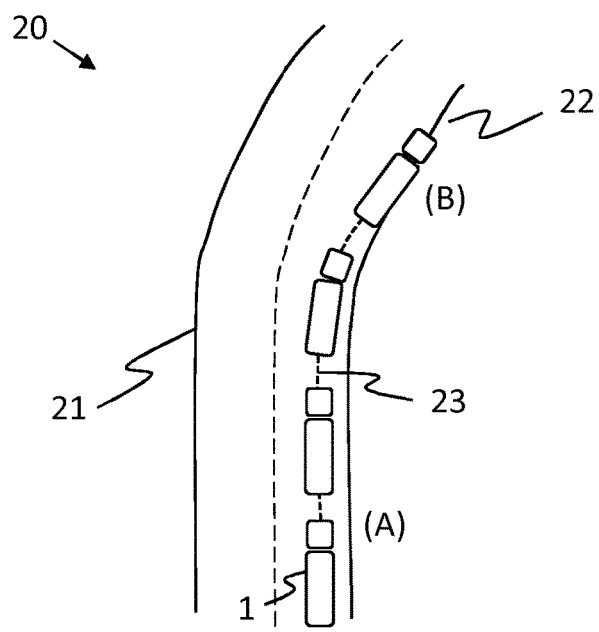
FIG. 2 illustrates an example situation avoidance maneuver by a vehicle.

FIG. 2 shows an example SAM 23. A vehicle 1 is travelling on a road 21 with two lanes. Most likely the left hand lane may comprise traffic in the opposite direction and is therefore to be avoided. The vehicle 1 determines that a SAM is necessary at location (A), for instance due to some type of system failure. A SAM track 23 is determined to transition the vehicle 1 into a safe state at location (B) where a full stop is made at the side of the road 22. The SAM 23 is determined by an acceleration profile which describes how hard the vehicle should brake at different points along the track, as well as a lateral control law which describes how the vehicle should turn in order to safely transition into the safe state at the location (B).

To ensure vehicle safety, a 'safety net' can be included in the vehicle control function. The task of the safety net is to monitor vehicle control commands to ensure that the vehicle is not ending up in a state from which, e.g., a safe blind stop cannot be guaranteed. Conceptually, this monitoring problem can be seen as a forward reachability problem. A forward reachability analysis is, in general, a computationally demanding operation that has to be performed online to account for various initial conditions and different types of disturbances.

The monitoring problem in this safety net concept can be summarized by the following question: If we apply the current control action, can we then ensure or predict that a successful blind stop can be performed at the next decision time instant with some reasonable probability?

If we have a set of states, in the following referred to as a safe set, for which a successful blind stop is guaranteed, we can use the candidate control input and a model of the system to predict if the states belong to the safe set at the next sampling instant. If we can confirm a robust set membership of the state vector the control input is approved by the monitor. If the control input is not approved, a SAM such as a blind stop can be initiated.

According to aspects, it is possible to express a set of safe states only in terms of the states of the model, i.e. a safe behavior of the vehicle can be expressed as x∈S, for some safe set S.

Intuitively, it is possible to express safe states in terms of the lateral position of the vehicle if the Operation Design Domain (ODD) is simple enough (e.g. if it is restricted to highway driving).

Executing a safe maneuver explicitly prevents carrying out the transport mission until safe nominal control can be restored. However, safe maneuvers are typically not unique; at any operation point there are several ways to avoid an accident and knowing more than a single way makes the system more robust towards changes in the traffic situation.

Some details on how a safe set can be determined will now be given.

A polyhedron is defined as the solution set to a finite number of linear inequalities. If an inequality can be removed from the description of a polyhedron without changing the solution set, the inequality is redundant. Similarly, if an inequality is not redundant, it is necessary (or non-redundant). If all inequalities describing a polyhedron are necessary, the inequalities constitute a minimal-representation of the polyhedron.

A polytopic linear system is a discrete-time linear system on the form $x(k+1)=A(k)x(k)+B(k)w(k)$, where x and w denote the state variables and an exogenous disturbance respectively. The exogenous disturbance may, according to some aspects, be assumed to bounded. The present disclosure provides some methods for determining such bounds. The exogenous disturbance may, according to some other aspects, be assumed to be within some range with a given probability, e.g., five nines or 99.999%. Polytopic linear systems are known in general and will not be discussed in more detail herein.

The present disclosure provides methods for characterizing model errors, such as the disturbances w. Assume a model of the nominal behavior of a vehicle system given by $$x_{k+1}=f(x_k,u_k)$$

and sequences of state and input measurements, $\{x_i\}_{i=1}^{n}$ and $\{u_i\}_{i=1}^{n-1}$. It is then straight forward to, a posteriori, form the associated prediction errors $$\varepsilon_i=x_{i+1}-f(x_i,u_i), i=1,\ldots,n-1$$

Then, for a high enough threshold, $\zeta \in R^{n_x}$, the values of $\{\varepsilon_i\}_{i=1}^{n-1}$ that exceeds the threshold (i.e. $\varepsilon_i : \varepsilon_i \not< \zeta$ since $\zeta$ (is multidimensional) will asymptotically converge to a multivariate Generalized Pareto Distribution (GPD).

In statistics, the GPD is a family of continuous probability distributions. It is often used to model the tails of another distribution. It is often specified or parameterized by three parameters: location μ, scale σ, and shape ξ. Sometimes it is specified by only scale and shape and sometimes only by its shape parameter.

The exceedances $\varepsilon_i:\varepsilon_i \not< \zeta$ can be used to estimate the parameters of the GDP (with corresponding confidence). The identified GPD can in turn be used to find $\overline{w}$ such that $Prob(\varepsilon_k \not\in W) \leq \gamma$ are fulfilled with a confidence β.

In ADS applications, γ is often very small, e.g., on the order of $10^{-8}$, which makes gathering enough data to observe occurrences where $\varepsilon_k \not\in W$ very time consuming. Thus, using classical methods of model characterization is problematic.

To summarize, there is provided herein a method for quantifying correctness of a model f(•) associated with a vehicle which comprises obtaining prediction errors $\varepsilon_{i_{i=1}}^{n-1}$ by evaluating the model f(•) over a range of input parameters. According to aspects, the method also comprises ascertaining that the spread of input parameters is sufficient so as to probe the method over a significant input parameter region. In other words, model correctness characterization may be improved by using diverse input parameters rather than input parameters which do not differ very much. For instance, the obtaining may comprise evaluating the model to generate a set of prediction errors which differ along a set of dimensions corresponding to a dimensionality of a state vector associated with the vehicle, since it is preferred to separate the obtained prediction errors in state space to obtain a measure of diversity.

To generate the prediction errors $\varepsilon_{i_{i=1}}^{n-1}$ outputs from the model $f(\bullet)$ can be compared to some ground truth values. For instance, the ground truth values may be obtained from measurements of current vehicle state, or from some external measurement system, or can be a-priori known. Consequently, the method may also comprise obtaining ground truth values corresponding to the model evaluations and generating the prediction errors based on a comparison between ground truth values and corresponding model evaluations. For example, the model may predict vehicle acceleration in response to some control input. The ground truth may then be obtained by stimulating an actual vehicle with the control input and observing outputs from an accelerometer device arranged on the vehicle.

The method also comprises determining a threshold $\zeta$ such that the prediction errors in excess of the threshold $\zeta$, $\{\varepsilon_i : \varepsilon_i \not\leq \zeta\}$, follow a Generalized Pareto Distribution, GDP. There are many known test for determining is a set of samples follow a GDP or not. See, e.g., "Goodness-of-Fit Tests for the Generalized Pareto Distribution" by V. Choulakian and M. A. Stephens, Technometrics, Vol. 43, No. 4 (November 2001), pp. 478-484, and references cited therein. There are also known methods for parameterizing a GDP based on the prediction errors in excess of the threshold $\zeta$ $\{\varepsilon_i : \varepsilon_i \not< \zeta\}$. Once a GDP has been parameterized to describe the prediction errors in excess of the threshold $\zeta$, it is possible to quantify correctness of the vehicle model $f(\bullet)$ based on the parameterized GDP. For instance, the probability $\text{Prob}(\varepsilon_k \notin W) \leq \gamma$, for arbitrary W and $\gamma$ can be determined. Also, the prediction error $\varepsilon_k$ of a given vehicle model may be quantified by a bounded disturbance model, i.e., bounding the error to lie within a range $-\overline{w} \leq \varepsilon_k \leq \overline{w}$ with probability greater than $1-\gamma$, based on the parameterized GDP.

Multivariate GDPs was described by H. Rootzen and N. Tajvidi in "Multivariate generalized Pareto distributions", Bernoulli 12(5), 2006, pp. 917-930, which also comprises a number of references related to the topic of GDPs. Thus, GDPs are known in general and will not be discussed in more detail herein.

The vehicle model has a verified correctness of $\gamma$ with confidence value $\beta$, which confidence value $\beta$ is associated with the parameterized GDP. Methods for determining the confidence value $\beta$ are also known and will not be discussed in more detail herein. The confidence value depends at least in part on the number of observations collected over the threshold (and provides constructive feedback on the needed amount of data. This way, it can be estimated when a sufficient data set has been gathered for quantifying model correctness, and when more data is needed. An advantage of the disclosed methods is therefore that they can be used to assess a sufficiency of gathered model data for model correctness verification based on the confidence value $\beta$ associated with the parameterized GDP. Thus, if the confidence value $\beta$ is too low after the GDP has been parameterized, then more data may be needed in order to increase the confidence value.

Although the described quantification of correctness may be performed off-line (i.e. in a design phase), the identified GDP distribution can also be used to construct monitors of the ODD for on-line use as well. In particular, if state and input measurements are collected online, the distribution of the exceedances can be monitored. A significantly different distribution of exceedances compared to the distribution that was obtained offline indicates that the system is out of its ODD. In other words, by the disclosed techniques is becomes possible to monitor an ODD associated with the vehicle by comparing the parameterized GDP to a set of baseline GDP parameters. Operation outside the ODD is for instance indicated by a difference between parameterized GDP parameters and baseline GDP parameters. A warning signal or SAM may be triggered in case operation outside the ODD is detected.

A simple monitor of this kind is to calculate the return period (i.e. the average time between exceedances) over some time window. A significant decrease of the return period is then an indication that the vehicle is operated outside of its ODD.

As mentioned above, these particular aspects of the disclosed methods are also applicable as a foundation for independent stand-alone methods not depending on the above discussed methods. Consequently, there is disclosed herein a method for monitoring an ODD associated with vehicle. The method comprises obtaining a parameterized GDP from prediction errors related to a vehicle model used during vehicle operation, like described above or in some other way. The method also comprises monitoring an ODD associated with the vehicle by comparing the parameterized GDP to a set of baseline GDP parameters, wherein operation outside the ODD is indicated by a difference between parameterized GDP parameters and baseline GDP parameters. It is appreciated that this method can be a stand-alone method which can be executed independently of the other methods discussed herein.

The method optionally comprises measuring a time between exceedances metric indicating the time passed between errors exceeding the threshold $\zeta$, and monitoring ODD based on the time between exceedances metric.

Some ADS-related applications of the above discussed methods of model correctness characterization will now be given. In particular, methods for assuring that a SAM can be executed with high probability will be described.

Figure 3:
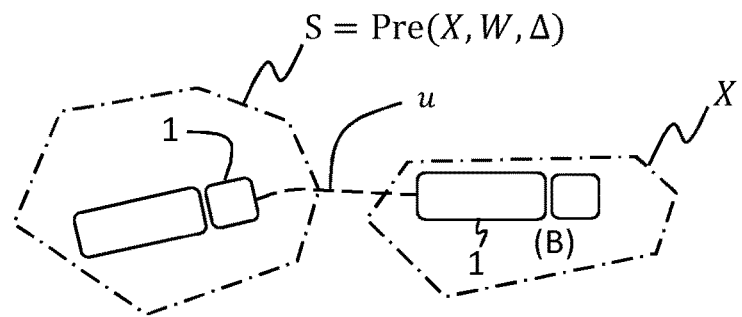
FIGS. 3-4 schematically illustrate example safe sets.
Figure 4:
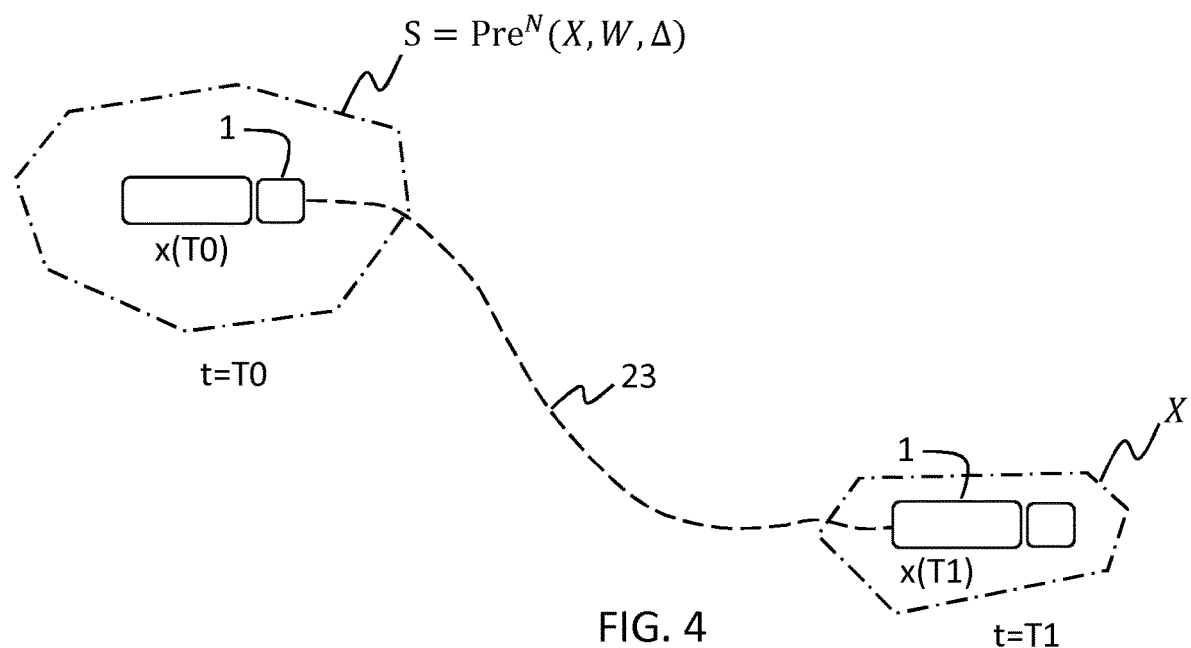

With reference to FIG. 3, for a given target set X, the one-step robust controllable set (or preimage set) $S=\text{Pre}(X, W, \Delta)$ is defined as the set of states that gets robustly mapped to X by $x(k+1)=A(k)x(k)+B(k)w(k)$, where $\Delta$ represents the convex hull of matrix pairs (A,B) and $w \in W$. Preimage sets were discussed by, e.g., F. Borrelli, A. Bemporad, and M. Morari, in "Predictive Control for linear and hybrid systems", Cambridge University Press, 2015, and will therefore not be discussed in more detail herein.

The preimage set S is the set of vehicle states for which there exist a control signal u (shown in FIG. 3) that transitions the vehicle state into a state comprised in the target set of states X, for all $w \in W$. The set of disturbances can be assumed bounded, or it can be assumed to be some set representing a fixed probability of occurrence.

If X can be defined using a set of linear inequalities, i.e., if $X = \{x \in \mathbb{R}^{nx} | Hx \leq h\}$ for some matrix H and some vector h, then the one-step robust controllable set $\text{Pre}(X,W,\Delta)$ can be evaluated as $\text{Pre}(X,W,\Delta)=\{x \in \mathbb{R}^{nx} | HA_i x \leq \tilde{h}_i, i=1, 2, \ldots\}$, where element j of $\tilde{h}_i$ is given by $(\tilde{h}_i)_j = \min_{w \in W}(h_j - H_{j,:}B_i w)$, where we have introduced the notations $H_{j,:}$ for the j-th row of matrix H and $h_j$ for the j-th element of vector h. Thus, if the set W is polyhedral, the one-step robust controllable set can be calculated by solving a number of Linear Programs (LPs). A polyhedral set is obtained, e.g., by the above discussed methods of bounding a model prediction error $\varepsilon_k$, i.e., bounding the error to lie within a range $-\overline{w} \le \varepsilon_k \le \overline{w}$ with probability greater than $1-\gamma$, based on the parameterized GDP.

The N-step robust controllable set is the set of states that gets robustly mapped onto X by the system $x(k+1)=A(k)x(k)+B(k)w(k)$ in $N=(T1-T0)/t_s$ time steps, for some $t_s$. N-step robust controllable sets were also discussed by F. Borrelli, A. Bemporad, and M. Morari, in "Predictive Control for linear and hybrid systems", Cambridge University Press, 2015, and will therefore not be discussed in more detail herein.

Figure 5:
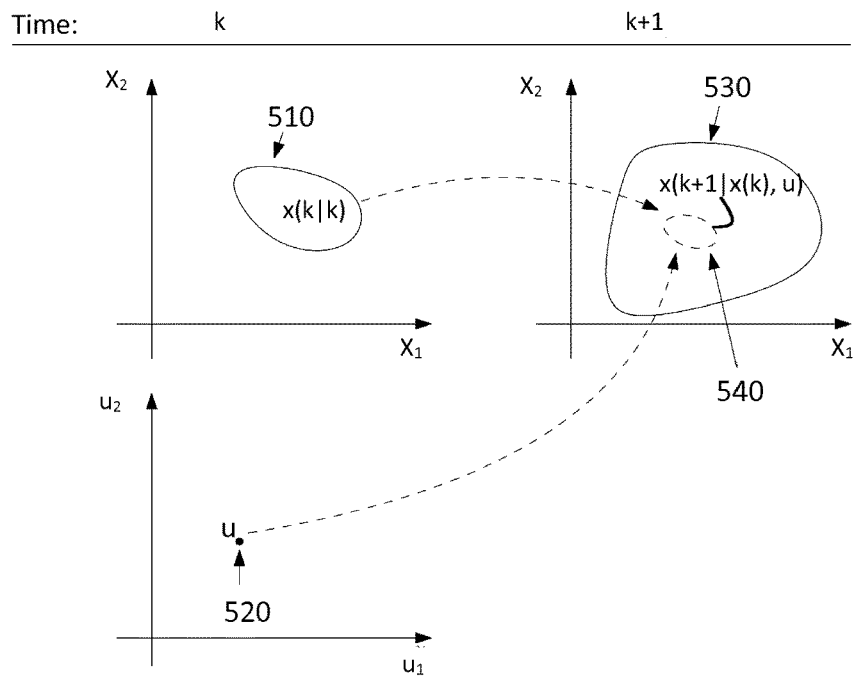
FIG. 5 schematically illustrates an example vehicle state prediction operation.

FIG. 5 schematically illustrates some aspects of predicting vehicle state x. At time k the vehicle state $x(k|k)$ is associated with a vehicle state uncertainty measure 510 which describes the accuracy in the vehicle state estimate. A perfect state estimate agrees totally with the 'true' vehicle state, while a more realistic vehicle state estimate will differ compared to the true state according to some error distribution. A common way to represent vehicle state uncertainty is by a covariance matrix representing expected error variation, or by an uncertainty ellipse. The uncertainty may also be represented by a polytope or by some more general bounding construct. Again, a polytope can be obtained by the above discussed methods of bounding a model prediction error $\varepsilon_k$, i.e., bounding the error to lie within a range $-\overline{w} \le \varepsilon_k \le \overline{w}$ with probability greater than $1-\gamma$, based on the parameterized GDP.

A control command u 520 is issued at time k, which control command will influence the vehicle state, and the vehicle state uncertainty 540 at time k+1. The uncertainty measure can be compared to the set of safe states 530 at time k+1. This way a more robust system can be obtained, since the vehicle state uncertainty can be accounted for when determining if the control command precludes a future SAM or not.

Figure 6:
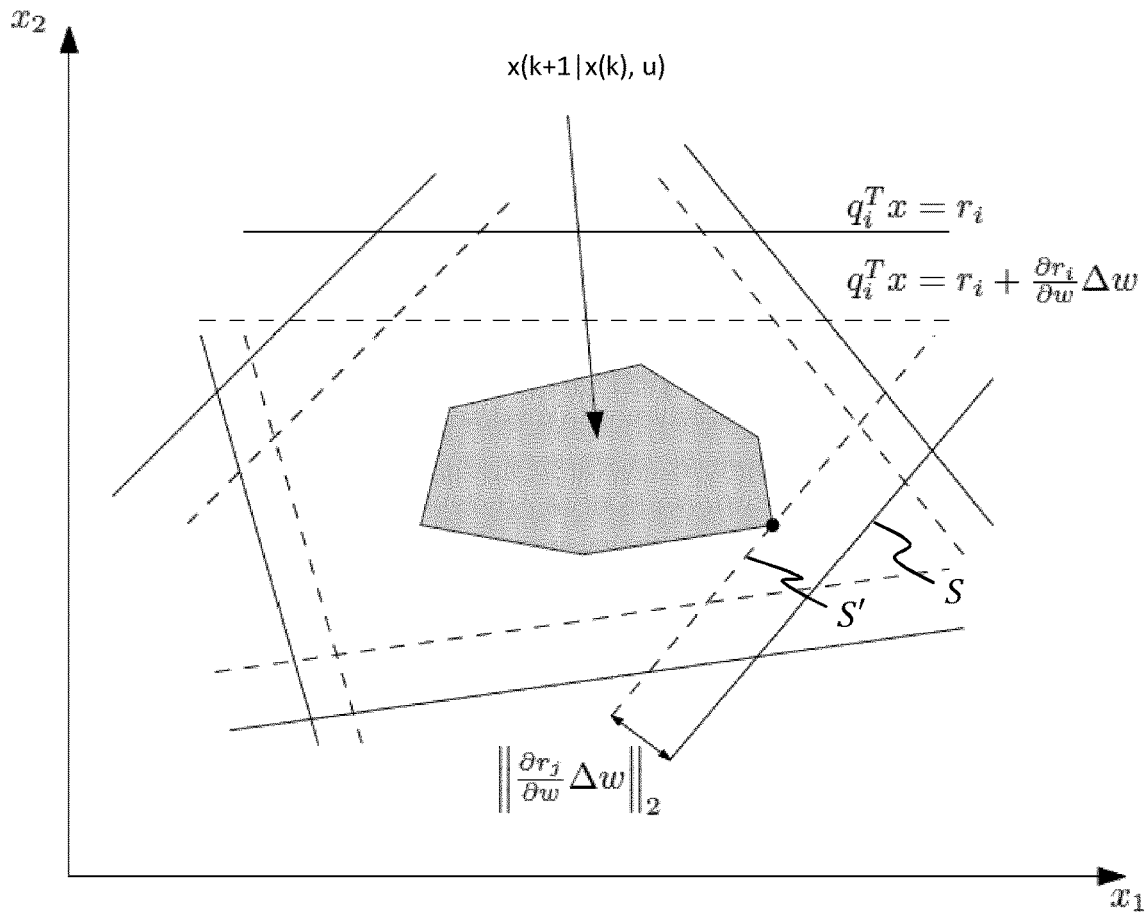
FIG. 6 schematically illustrates an adjusted safe set.

FIG. 6 illustrates a nominal safe set S which has been modified into an adjusted safe set S'. Let us assume that the disturbance set W can, by the methods disclosed herein, be expressed as $W=\{w=[\alpha^T \beta^T]^T | -\gamma \le \alpha \le \gamma, Q\beta \le r\}$, for some vector $\gamma>0$. When evaluating the preimage set according to the discussions above, we use the notations $\mu_{i,j} \ge 0$ and $\pi_{i,j} \ge 0$ for the Lagrange dual variables corresponding to the inequalities $\alpha-\gamma \le 0$ and $-\alpha-\gamma \le 0$, respectively. Note that, due to complementary slackness, the Lagrange dual variables cannot be (elementwise) non-zero simultaneously. Let us now introduce the notation $\lambda_{i,j}=\max(\mu_{i,j},\pi_{i,j})$, where max(a,b) is a vector containing the elementwise maximum of its arguments, and note that $$\frac{\partial (\tilde{h}_i)_j}{\partial \gamma} = \lambda_{i,j}^T.$$

It is then straightforward to express the preimage set as $$Pre(X, W, \Delta) = \left\{ x \in \mathbb{R}^{nx} \,\middle|\, HA_i x \le \tilde{h}_i + \frac{\partial \tilde{h}_i}{\partial \gamma} \Delta_\gamma, \right.$$

i=1, 2, ... }, where $\Delta_\gamma$ denotes a possible deviation from the value of $\gamma$ that was used in the evaluation of the preimage set.

In a similar fashion the sensitivities can then be propagated through the recursive process discussed above in order to express the adjusted safe set as $$S' = \left\{ x \in \mathbb{R}^{nx} \,\middle|\, Qx \le r + \frac{\partial r}{\partial \gamma} \Delta_\gamma \right\}$$

It is somewhat interesting to note that the choice of $\gamma$ does not affect the orientation of the linear inequalities but only their distance from the origin.

It should be observed that redundant inequalities can become necessary if $\gamma$ is updated. The minimal-representations should therefore be calculated with care, and some inequalities that are nominally redundant may have to be kept in the description of the set. For a safe set of the form $$S' = \left\{ x \in \mathbb{R}^{nx} \,\middle|\, Qx \le r + \frac{\partial r}{\partial \gamma} \Delta_\gamma \right\},$$

it is principally simple to adjust the size of the safe set when the driving conditions motivate a different choice of $\gamma$. However, when the size of the set is decreased, it should be made sure that the current one-step prediction of the vehicle dynamics is still contained in the safe set, as depicted in FIG. 10. In the following, we provide a description of how the maximum $\Delta_\gamma$ can be calculated online if $\alpha$ is scalar. It is assumed that the one-step prediction of the system dynamics is represented by the convex hull of a set of points, i.e., $x(k+1) \in Co(x_1, \ldots, x_p)$.

Let us calculate the residual of the inequalities that define the safe set for each such point, $\epsilon_j = Qx_j - r, j=1, \ldots, p$. For element i of $\epsilon_j$, we can then calculate the $\Delta_\gamma$ that would result in $(\epsilon_j)_i = 0$. The maximum allowed $\Delta_\gamma$ is then obtained as the minimum of the results.

Figure 7:
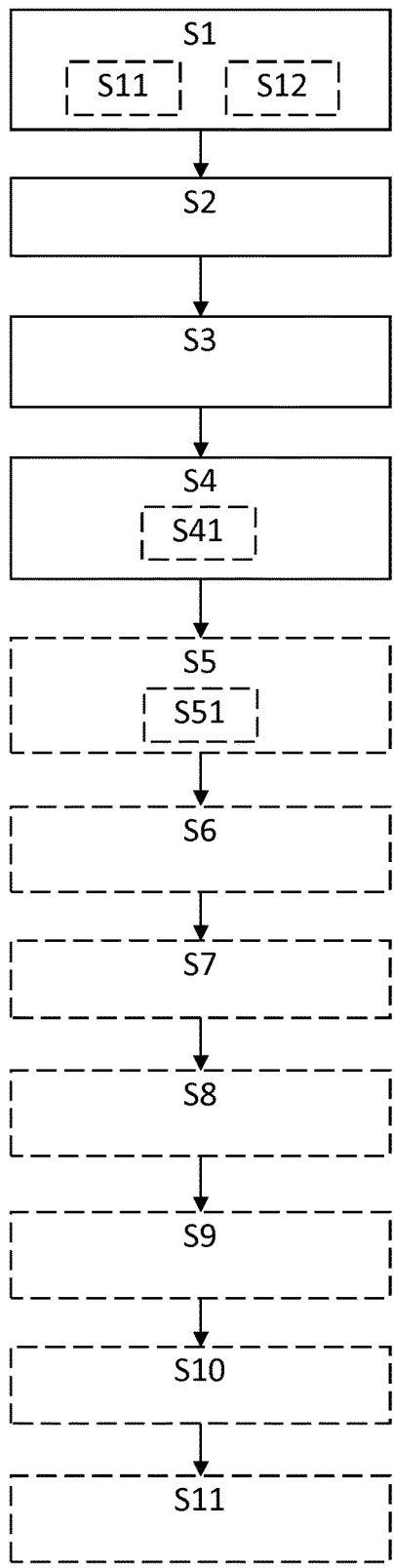
FIG. 7 is a flow chart illustrating methods.

FIG. 7 shows a flow chart illustrating methods that summarize aspects of the above discussion. FIG. 7 illustrates a method for quantifying correctness of a model f(•) associated with a vehicle. The method comprises obtaining S1 prediction errors E by evaluating the model f(•) over a range of input parameters, determining S2 a threshold $\zeta$ such that the prediction errors in excess of the threshold $\zeta$, $\{\varepsilon_i : \varepsilon_i \nless \zeta\}$, follow a Generalized Pareto Distribution, GDP, parameterizing S3 a GDP based on the prediction errors in excess of the threshold $\zeta$ $\{\varepsilon_i : \varepsilon_i \nless \zeta\}$, and quantifying S4 correctness of the vehicle model f(•) based on the parameterized GDP.

The GDP is a very useful tool is assessing model correctness. It can, among other things, be used to efficiently determine probabilities such as $\text{Prob}(\varepsilon_k \notin \{w|-\overline{w} \le w \le \overline{w}\}) \le \gamma$, even though the probabilities involved are very small. An advantage of the disclosed techniques is that the required amount of data that is needed in order to quantify correctness of vehicle models is significantly reduced. This is an especially important advantage in ADS applications due to the strict safety requirements and the low error probabilities involved.

As discussed above, to generate the prediction errors $\varepsilon_{i_{j=1}}^{n-1}$ outputs from the model f(•) can be compared to some ground truth values. For instance, the ground truth values may be obtained from measurements of current vehicle state, or from some external measurement system, or can be a-priori known.

According to some aspects, the obtaining comprises obtaining S11 a previously stored sequence of vehicle states $\{x_i\}_{i=1}^n$ and control inputs $\{u_i\}_{i=1}^{n-1}$, and determining prediction errors as $\varepsilon_i = x_{i+1} - f(x_{i=1}, u_i)$, $i=1, \ldots, n-1$. According to some other aspects, the obtaining comprises obtaining S12 a sequence of vehicle states $\{x_i\}_{i=1}^n$ and control inputs $\{u_i\}_{i=1}^{n-1}$ during vehicle operation, and determining prediction errors as $\varepsilon_i = x_{i+1} - f(x_i, u_i)$, $i=1, \ldots, n-1$.

Thus, the disclosed models are applicable for both off-line and on-line processing.

According to aspects, the method comprises quantifying S41 the prediction error $\varepsilon_k$ of the vehicle model as a bounded disturbance model by bounding it to lie within a range $-\overline{w} \leq \varepsilon_k \leq \overline{w}$ with probability greater than $1-\gamma$, based on the parameterized GDP. Such bounded disturbance models allow formal methods from control theory which can be used to show that, e.g., a SAM is associated with a given probability of success, or even guaranteed to succeed given some assumptions. Some such formal methods were discussed above.

According to some aspects, the method comprises determining S5 a confidence value #3 associated with the parameterized GDP. According to some such aspects, the method comprises assessing S51 a sufficiency of gathered model data for model correctness verification based on the confidence value $\beta$ associated with the parameterized GDP.

This confidence value can be used to assess data quality. Thus, another feature of the disclosed techniques is that it provides constructive feedback on when the data collection is done.

According to aspects, the method comprises monitoring S6 an operational design domain, ODD, associated with the vehicle by comparing the parameterized GDP to a set of baseline GDP parameters. Operation outside the ODD may, e.g., be indicated by a difference between parameterized GDP parameters and baseline GDP parameters.

Advantageously, intermediate results can be used to construct a monitor of the ODD.

According to aspects, the method comprises measuring S7 a time between exceedances metric indicating the time passed between errors exceeding the threshold $\zeta$, and monitoring ODD based on the time between exceedances metric. This is a relatively simple metric to determine, yet it provides some valuable insights into how the vehicle is operating.

According to aspects, the method comprises triggering a warning signal in case the vehicle operates outside of a predefined ODD.

There is also disclosed herein related methods for determining if a vehicle control command $u_k$ for controlling a vehicle 1 associated with a current vehicle state $x_{k|k}$ precludes a future SAM by the vehicle 1. The method further comprises obtaining S8 one or more safe sets $S_1, S_2, \ldots S_K$, wherein each safe set represents a range of vehicle states from which a future SAM can be initialized with prospect for success and obtaining S9 the current vehicle state $x_{k|k}$ and the control command $u_k$. The method comprises predicting S10 a future vehicle state $x_{k+1|k}$ based on the current vehicle state $x_{k|k}$ and on the control command $u_k$, wherein the predicting comprises predicting the future vehicle state $x_{k+1|k}$ based on the bounded disturbance model. The method also comprises comparing S11 the predicted future vehicle state $x_{k+1|k}$ to the one or more safe sets $S_1, S_2, \ldots S_K$ and determining that the control command $u_k$ precludes the future SAM if the predicted future vehicle state $x_{k+1|k}$ is not comprised in any of the one or more safe sets $S_1, S_2, \ldots S_K$.

According to aspects, a SAM is considered as precluded in case at least one disturbance sequence exists which cannot be compensated for by a corresponding control law to reach the target range of vehicle states.

Thus, the disclosed methods for characterizing correctness of a vehicle model finds applications in Level 4 automation, ADS, and also in ADAS systems.

Figure 8:
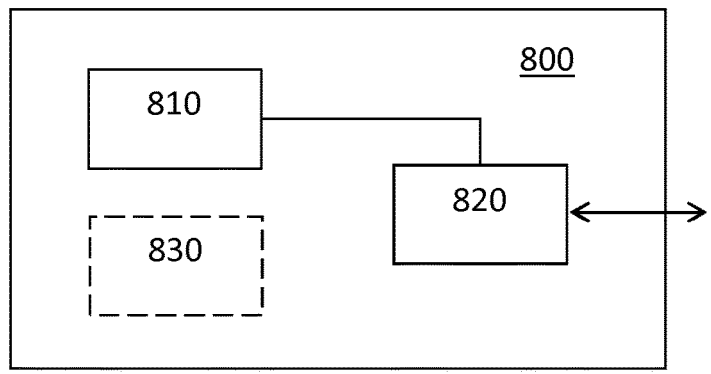
FIG. 8 schematically illustrates a control unit.

FIG. 8 schematically illustrates, in terms of a number of functional units, the components of a control unit 800 according to embodiments of the discussions herein. This control unit 800 may be comprised in the articulated vehicle 1. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 800 to perform a set of operations, or steps, such as the methods discussed in connection to FIG. 10. For example, the storage medium 830 may store the set of operations, and the processing circuitry 810 may be configured to retrieve the set of operations from the storage medium 830 to cause the control unit 800 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 800 may further comprise an interface 820 for communications with at least one external device, such as an external processing device arranged for generating safe sets off-line. As such the interface 820 may comprise one or more transmitters and receivers, comprising analogue and digital components and a suitable number of ports for wireline or wireless communication.

The processing circuitry 810 controls the general operation of the control unit 800, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
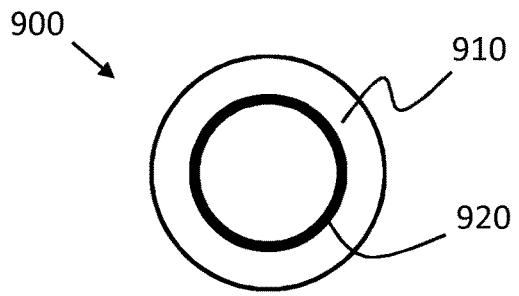
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A method for quantifying correctness of a model $f(\bullet)$ applied to control a vehicle arranged for Level 4 automation and/or for advanced driver assistance, the method comprising;
   obtaining prediction errors $\varepsilon_{i_{i=1}}^{n-1}$ by evaluating the model $f(\bullet)$ over a range of input parameters by obtaining a previously stored sequence of vehicle states $\{x_i\}_{i=1}^n$ and control inputs $\{u_i\}_{i=1}^{n-1}$ associated with the vehicle, and determining prediction errors as $\varepsilon_i = x_{i+1} - f(x_i, u_i)$, $i=1, \ldots, n-1$,
   determining a threshold $\zeta$ such that the prediction errors in excess of the threshold $\zeta$, $\{\varepsilon_i : \varepsilon_i \nless \zeta\}$, follow a Generalized Pareto Distribution (GDP)

parameterizing a GDP based on the prediction errors in excess of the threshold $\zeta$ $\{\varepsilon_i: \varepsilon_i \not< \zeta\}$, quantifying correctness of the model f(•) based on the parameterized GDP;

determine a probability of success associated with a situation avoidance maneuver (SAM) based on the correctness of the model f(•);

controlling the vehicle to execute the SAM when the probability exceeds a threshold.

2. The method according to claim 1, comprising quantifying the prediction error $\varepsilon_k$ of the vehicle model as a bounded disturbance model by bounding it to lie within a range $-\overline{w} \leq \varepsilon_k \leq \overline{w}$ with probability greater than $1-\gamma$, based on the parameterized GDP.

3. The method according to 1, comprising determining a confidence value $\beta$ associated with the parameterized GDP.

4. The method according to claim 3, comprising assessing a sufficiency of gathered model data for model correctness verification based on the confidence value $\beta$ associated with the parameterized GDP.

5. The method according to claim 2, for determining if a vehicle control command for controlling the vehicle associated with a current vehicle state precludes a future situation avoidance maneuver, SAM, by the vehicle, the method further comprising;

obtaining one or more safe sets, wherein each safe set represents a range of vehicle states from which a future SAM can be initialized with prospect for success, obtaining the current vehicle state and the control command;

predicting a future vehicle state based on the current vehicle state and on the control command, wherein the predicting comprises predicting the future vehicle state based on the bounded disturbance model, and comparing the predicted future vehicle state to the one or more safe sets and determining that the control command precludes the future SAM if the predicted future vehicle state is not comprised in any of the one or more safe sets.

6. The method according to claim 5, wherein the SAM is precluded in case at least one disturbance sequence exists which cannot be compensated for by a corresponding control law to reach a target range of vehicle states.

7. The method according to claim 1, comprising monitoring an operational design domain, ODD, associated with the vehicle by comparing the parameterized GDP to a set of baseline GDP parameters, wherein operation outside the ODD is indicated by a difference between parameterized GDP parameters and the baseline GDP parameters.

8. The method according to claim 7, comprising measuring a time between exceedances metric indicating the time passed between errors exceeding the threshold $\zeta$, and monitoring the ODD based on the time between exceedances metric.

9. The method according to claim 7, comprising triggering a warning signal in case the vehicle operates outside of the ODD.

10. A non-transitory computer readable medium carrying a computer program comprising program code for performing steps of claim 1 when said program code is run on a computer or on processing circuitry of a control unit said program code performs: obtaining prediction errors $\varepsilon_{i_{i=1}}^{n-1}$ by evaluating the model f(•) over a range of input parameters by obtaining a previously stored sequence of vehicle states $\{x_i\}_{i=1}^{n}$ and control inputs $\{u_i\}_{i=1}^{n-1}$ associated with the vehicle, and determining prediction errors as $\varepsilon_i = x_{i+1} - f(x_i, u_i)$, $i=1, \ldots, n-1$, determining a threshold $\zeta$ such that the prediction errors in excess of the threshold $\zeta$, $\{\varepsilon_i: \varepsilon_i \not< \zeta\}$, follow a Generalized Pareto Distribution, GDP, parameterizing a GDP based on the prediction errors in excess of the threshold $\zeta$ $\{\varepsilon_i: \varepsilon_i \not< \zeta\}$, quantifying correctness of the model f(•) based on the parameterized GDP;

determine a probability of success associated with a situation avoidance maneuver (SAM) based on the correctness of the model f(•);

controlling the vehicle to execute the SAM when the probability exceeds a threshold.

11. A control unit for quantifying correctness of a vehicle model f(•), the control unit being configured to perform:

obtaining prediction errors $\varepsilon_{i_{i=1}}^{n-1}$ by evaluating the model f(•) over a range of input parameters by obtaining a previously stored sequence of vehicle states $\{x_i\}_{i=1}^{n}$ and control inputs $\{u_i\}_{i=1}^{n-1}$ associated with the vehicle, and determining prediction errors as $\varepsilon_i = x_{i+1} - f(x_i, u_i)$, $i=1 \ldots, n-1$, determining a threshold $\zeta$ such that the prediction errors in excess of the threshold $\zeta$, $\{\varepsilon_i: \varepsilon_i \not< \zeta\}$, follow a Generalized Pareto Distribution, GDP, parameterizing a GDP based on the prediction errors in excess of the threshold $\zeta$ $\{\varepsilon_i: \varepsilon_i \not< \zeta\}$, quantifying correctness of the model f(•) based on the parameterized GDP;

determine a probability of success associated with a situation avoidance maneuver (SAM) based on the correctness of the model f(•);

controlling the vehicle to execute the SAM when the probability exceeds a threshold.

12. A vehicle comprising a control unit quantifying correctness of a vehicle model f(•), the control unit being configured to perform steps of:

obtaining prediction errors $\varepsilon_{i_{i=1}}^{n-1}$ by evaluating the model f(•) over a range of input parameters by obtaining a previously stored sequence of vehicle states $\{x_i\}_{i=1}^{n}$ and control inputs $\{u_i\}_{i=1}^{n-1}$ associated with the vehicle, and determining prediction errors as $\varepsilon_i = x_{i+1} - f(x_i, u_i)$, $i=1, \ldots, n-1$, determining a threshold $\zeta$ such that the prediction errors in excess of the threshold $\zeta$, $\{\varepsilon_i: \varepsilon_i \not< \zeta\}$, follow a Generalized Pareto Distribution, GDP, parameterizing a GDP based on the prediction errors in excess of the threshold $\zeta$ $\{\varepsilon_i: \varepsilon_i \not< \zeta\}$, quantifying correctness of the model f(•) based on the parameterized GDP;

determine a probability of success associated with a situation avoidance maneuver (SAM) based on the correctness of the model f(•);

controlling the vehicle to execute the SAM when the probability exceeds a threshold.

* * * * *